United States Patent [19]

Cannon

[11] Patent Number: 4,703,727
[45] Date of Patent: Nov. 3, 1987

[54] PRE-START ENGINE LUBRICATION SYSTEM

[76] Inventor: Jesse D. Cannon, P.O. Box 3581, Longview, Tex. 75606

[21] Appl. No.: 863,185

[22] Filed: May 14, 1986

[51] Int. Cl.⁴ .............................................. F01M 1/00
[52] U.S. Cl. .................................. 123/196 S; 184/6.3
[58] Field of Search ........................ 123/196 S, 196 R; 184/1, 6.3

[56] References Cited

U.S. PATENT DOCUMENTS 3,722,623  3/1973  Waldecker ........................... 184/6.3
4,199,950  4/1980  Hakanson et al. ................... 184/6.3
4,359,140 11/1982  Shreve .............................. 123/196 S Primary Examiner—E. Rollins Cross
Attorney, Agent, or Firm—Crutsinger & Booth

[57] ABSTRACT

An improvement for lubricating internal combustion engines whereby an external source of pressurized oil is connected through the engine oil filter port into cooperative association with the internal engine lubrication galleys and the engine starting mechanism, whereby oil pressure is applied to critical internal parts of the engine before the starting mechanism is enabled, thereby to ensure adequate lubrication for engine starting.

16 Claims, 4 Drawing Figures

PRE-START ENGINE LUBRICATION SYSTEM

BACKGROUND OF THE INVENTION

This invention relates to improvements in engine lubricating systems and more particularly to such systems that ensure good lubrication to engine internal moving parts prior to engine turnover.

Auxiliary pre-start lubricating systems have heretofore been known, illustrative of which are those described in U.S. Pat. Nos. 2,102,514 granted to M. C. Clarkson on Dec. 14, 1937, 2,205,812 granted to A. L. Couty on June 25, 1940, 4,094,293 granted to John W. Evans on June 13, 1978, and 4,112,910 granted to Donald W. Percy on Sept. 12, 1978. The proposals of these patents provide for at least partial lubrication of engine moving parts prior to firing of the cylinders. Thus, for example, Couty U.S. Pat. No. 2,205,812 provides for injection of lubricating oil into the cylinders but makes no provision for the other moving engine parts such as the main and connecting rod bearings. Clarkson U.S. Pat. No. 2,102,514 provides for extracting oil from the normal engine reservoir (oil pan) and injecting it under pressure into the engine lubricating galleys through ports specially provided in the engine sidewalls for this purpose. Evans U.S. Pat. No. 4,094,293 provides a complex mechanism for pressurizing oil in a reservoir and injecting it into the normal engine lubricating galleys prior to engine start; and Percy U.S. Pat. No. 4,112,910 purposes use of a spring loaded mechanism for forcing oil into engine galley before the engine can be started.

While each of the foregoing patents at least partly addresses the need to provide pre-start engine lubrication, they either do not provide complete pre-start lubrication (as in case of Couty U.S. Pat. No. 2,205,812) or they accomplish the lubrication by mechanisms that require modification of existing engine designs. Moreover, some of these proposals appear complex and costly to manufacture. Accordingly, a need has continued to find a simple and inexpensive way to accomplish satisfactory pre-start oiling while at the same time being adapted for attachment to existing engines without requiring changes to the engine itself.

BRIEF SUMMARY OF THE INVENTION

The proposals of the instant invention solve the foregoing problems through the provisions and cooperative association of a small conventional motorized pump and a special reservoir with the engine oil filter and its associated ports, thereby providing pre-start lubrication simply and economically and without requiring any modification to the engine itself. It makes use of an adapter that fits between the oil filter and the engine block to advantageously utilize the normally existing engine block oil ports. This adapter operates in cooperative combination with the engine, oil filter and external source of pressurized oil to provide the desired level of pre-start lubrication. Since the apparatus of this invention makes use principally of simple and readily available components, requiring only the adapter to be specially fabricated, and since the adapter is simple and economical to manufacture, the apparatus of this invention solves the pre-start lubrication problem in a way that is attractive and cost-effective.

OBJECTS AND FEATURES

It is one general object of the invention to improve lubrication in internal combustion engines.

It is another object of the invention to provide an improved reservoir arrangement that is specially adapted for cooperative association with engine and auxiliary oil pump.

It is yet another object of the invention to simplify the way in which an exterior auxiliary oil source is connected in to the internal engine oil galleys.

It is still another object of the invention to eliminate the need for modificaiton of existing engines in order to provide pre-start lubrication.

Acccordingly, in accordance with one feature of the invention, a simple gear pump is disposed within a lubricant reservoir outside the engine and is operative in combination with an oil filter adapter to provide pressurized engine pre-start lubrication.

In accordance with another feature of the invention, an adapter-connector is mounted between an engine and its oil filter on the existing engine oil filter entry and exit ports, thereby simplifying connection and eliminating the necessity for providing special entry and exit ports to engine oil galleys.

In accordance with still another feature of the invention, the adapter-connector includes internal means for channeling lubricant into the engine during the pre-start phase of starting, and after the engine has started and its integral oil pump has raised oil pressure to the required level, to prevent undesired back flow of lubricant.

In accordance with yet another feature of the invention, the adapter-connector itself is to simple an inexpensive construction and requires little or no maintenance, thus contributing to its economy and durability.

These and other objects and features of the invention will be apparent from the following description of a preferred embodiment, by way of example, with reference to the drawing in which like symbols designate like parts.

DESCRIPTION OF A PREFERRED EMBODIMENT

Figure 1:
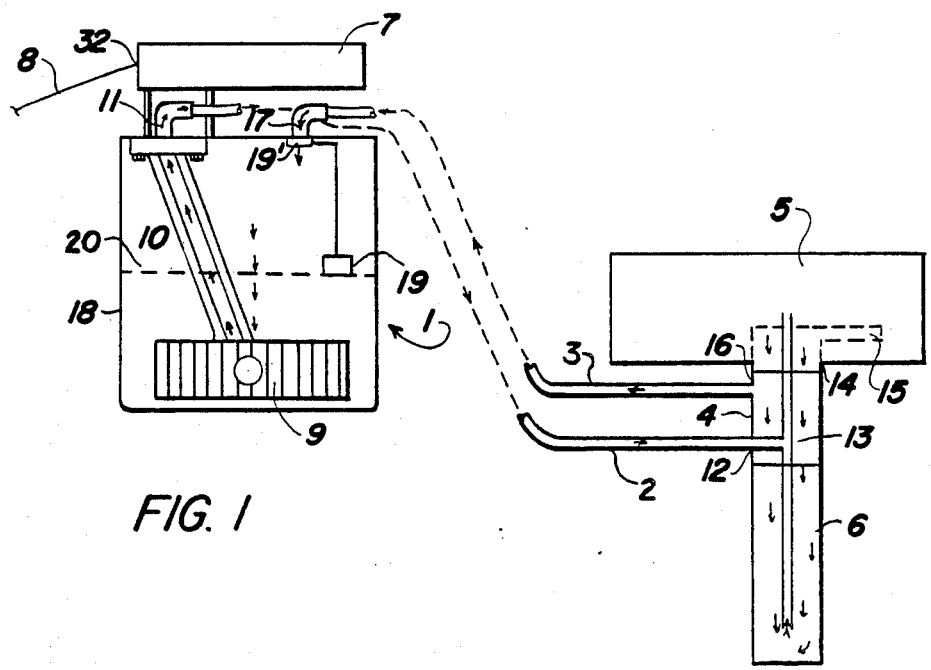
FIG. 1 is a schematic diagram showing the interrelationships of the complete pre-start oiling systems.

Now turning to the drawing and more particularly FIG. 1 thereof, it will be seen that the system according to the invention includes a source of high pressure lubricant generally shown at 1, a pair of lubricant-conducting hoses 2 and 3, and an adapter-connector 4. Also depicted are the block 5 of a conventional internal combustion engine and conventional oil filter 6. Connector-adapter 4 and source 1 are shown in detail in FIGS. 3 and 4 respectively.

Figure 2:
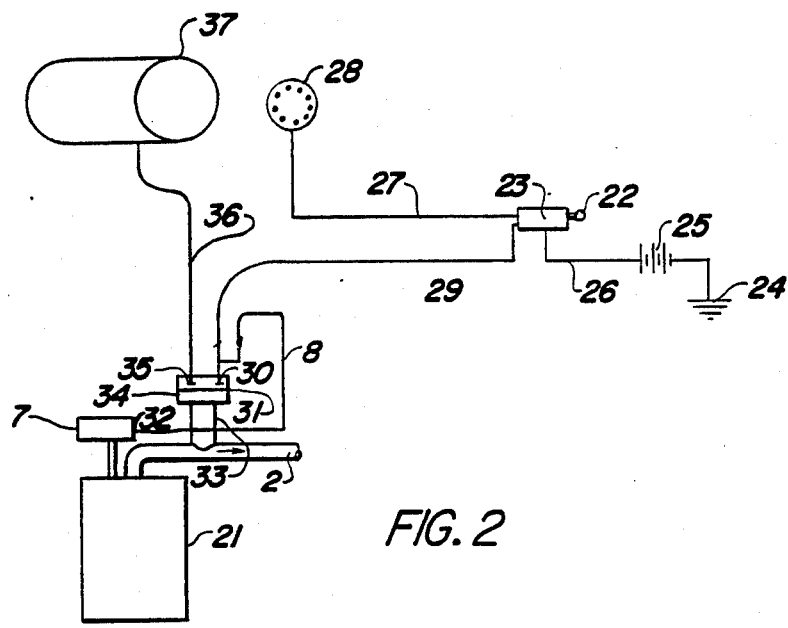
FIG. 2 is an electrical schematic diagram showing electrical control features of an embodiment of the invention.

A connection is made from electric motor 7 via conciductor 8 to the ignition switch of the vehicle or, as shown in FIG. 2, to an oil pressure activated contractor. When the motor 7 is activated, the pump 9 supplies highly pressurized oil through passage 10 and outlet port 11 to high pressure hose 2 whence it is conducted to inlet port 12 of connector-adapted 4. Thence it is conducted through internal passage 13 to the inlet port 14 which conventionally is disposed on the engine block for the purpose of receiving oil discharged from the oil filter. From there, it passes through the oiling galleys within the engine in order to lubricate its internal parts and provide well-oiled surfaces prior to engine starting. In order to prevent back-flow of the oil through the filter in reverse, a check valve is provided as will be described with respect to FIG. 3.

Also schematically shown in FIG. 1 is a source of oil 15 from within the engine that is produced by the conventional engine-driven oil pump (not shown). Once the engine has started, lubrication is provided by this conventional engine-driven pump, and the pre-start system of this invention is inactivated.

In most conventional internal combustion engines, the oil, after lubrication the internal engine surfaces, passes into the main engine oil reservoir. Therefore, it is necessary to replenish lubricant in the auxiliary reservoir 1. This is accomplished when the engine starts and the conventional engine oil pump commences operation. At that time, the normal engine oil pressure rises to a level such that a part of the oil flowing from oil pump source 15 and passing into adapter-connector 4 flows out exit port 16 and thence through high pressure hose 3 to inlet port 17 of oil reservoir 18. The level of this recharging oil is controlled automatically in that oil inflow will stop when the pressure in line 2 becomes approximately equal to the pressure in line 3. If desired, although not necessary, the level of this re-charging oil can be controlled in any of a variety of ways, including provision of a conventional mechanical float valve, e.g., valve 19—19' within the housing of oil reservoir 18 or an electrically operated valve connected to an oil level responsive electrical switch (not shown). When recharging has progressed to the predetermined level (shown as 20 in FIG. 1), the valve 19—19' would close and prevent the reservoir 18 from becoming overfilled.

FIG. 2 depicts typical electrical circuits suited for utilization of the invention. Conventional key 22 is shown in ignition switch 23. When key 22 is turned, contacts within the switch 23 are closed, thus completing a circuit from ground 24 through battery 25, conductor 26, the internal contacts of switch 23 and thence over two paths. The first of these paths is via conductor 27 to conventional distributor 28; and the other is via conductor 29 to one contact 30 of oil pressure switch 31, and via a parallel path via conductor 8 to an input terminal 32 of motor 7. When these paths are thus energized, motor 7 starts running, thereby driving pump 9 (FIG. 1) and creating oil pressure in line 2.

As will be observed, pressure switch 31 is in communication with line 2 via connector 33. When line pressure rises to a predetermined level, element 34 of switch 31 moves to bridge contacts 30 and 35, thereby extending energy from the battery via conductor 36 to activate starter 37 and start the engine. By delaying starter activation until oil pressure rises to the desired level, pre-start lubrication of internal engine parts is ensured.

Those skilled in the art are aware that once the engine starts and the ignition key 22 is released, ignition switch 23 springs back from the start position to the on position in which the circuit from battery 25 to distributor 28 is maintained, while the circuit to conductor 29, motor 7, switch 31, conductor 36, and starter 37 is interrupted. Accordingly, pump 7 and starter 37 are de-energized.

For installation in existing systems, it may or may not be practicable to connect the circuits for motor 7 through the ignition switch. In such event, a simple single pole single throw spring return switch could be installed in any convenient position under the dash of the vehicle (or for non-vehicular use, on or near the control panel) for manual operation.

Figure 3:
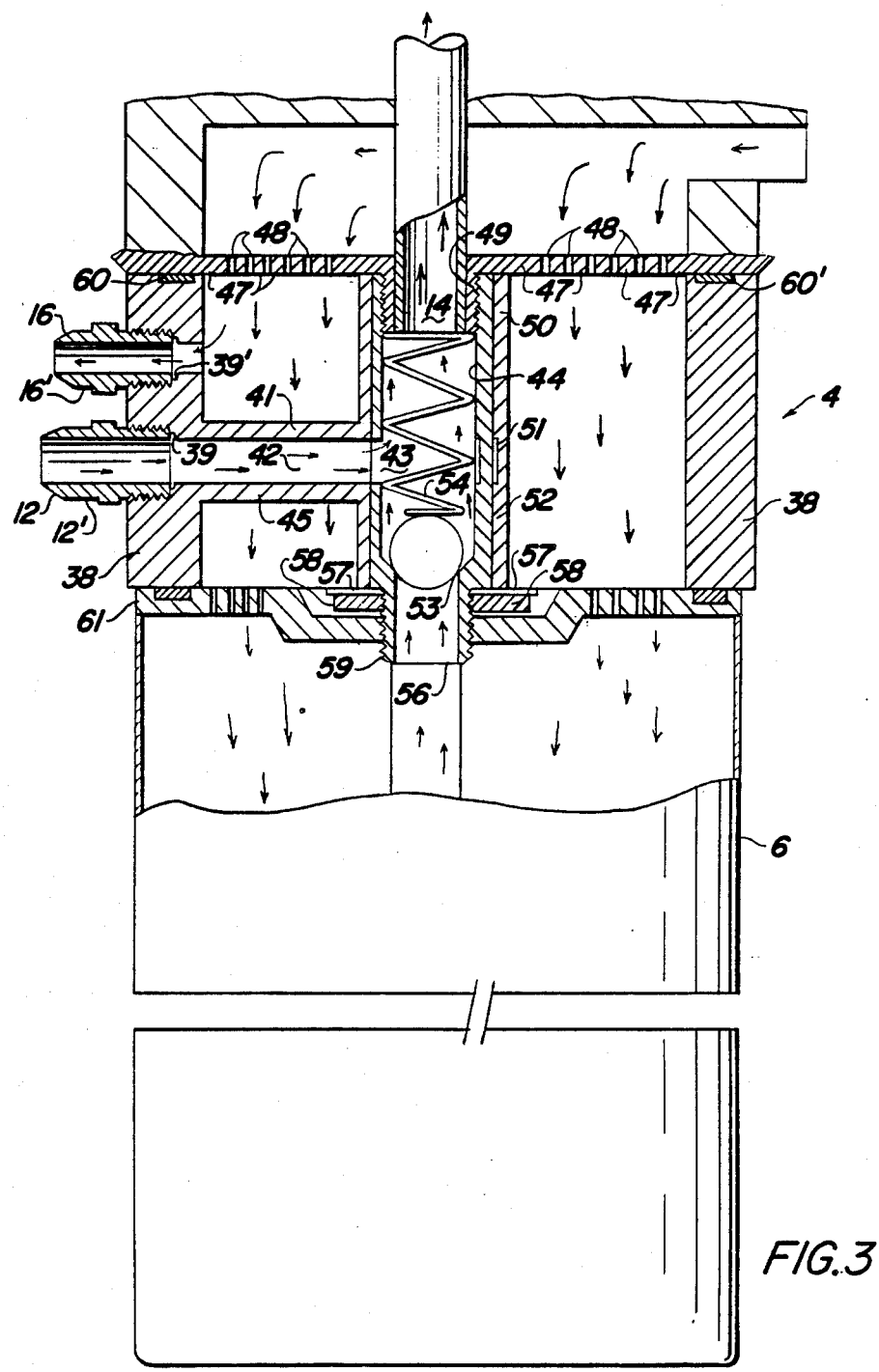
FIG. 3 is a sectional drawing showing the internal details of the adapter-connector.

FIG. 3 depicts the adapter-connector 4 in cross section. It includes main housing 38 which is cylindrical in cross section in order to mate with conventional oil filters which are generally cylindrical in geometry. Engaged into threaded apertures 39 and 39' are inlet port fitting 12 and outlet port fitting 16 respectively. As will be observed, these fittings have threaded exterior surfaces 12' and 16' which are adapted for connection to high pressure hoses 2 and 3.

The major part of the interior volume of adapter-connector 4 is unobstructed, thus creating an annular passage 40 therethrough. However, crossing this annular passage 40 is oil-conducting tubular passage 41, the interior 42 of which is in communication with the interior 43 of the adapter-connector attachment tube 44. The walls 45 of tubular passage 41 support and connect the axially aligned center cylindrical member 46 in rigid connection to main housing 38.

When it is desired to mount the adapter-connector on a conventional engine, the oil filter is removed, thus exposing the abutting portion of the engine block. This portion is generally shown at 47. Within this region there are engine oil outlet ports through which oil under pressure passes to the abutting inlet ports on the outer perimeter of the oil filter jacket. The oil then passes through the filter and re-enters the engine through oil inlet port 14. As will be observed, inlet port 14 includes a threaded projection 49 which is specially adapted for engagement with mating female threads (not shown) within the oil filter housing. As will be observed from inspection of the drawing, adapter-connector attachment tube 44 includes internal female threads 50 which are adapted for engagement with the male threads on the exterior of threaded projection 49. Accordingly, with the oil filter removed, attachment tube 44 is secured in place by threading it onto the mating threads.

After the attachment tube 44 is secured in place, the housing 38 of the adapter-connector 4 is fitted onto it (as shown), with center cylindrical member 46 surrounding and engaging attachment tube 44 in tight fitting relationship. To ensure integrity of such fit, and to prevent lubricant leakage, an oil gland 51 is disposed therebetween. Adapter-connector 4 is secured on attachment tube 44 by means of collar 57 and retaining nut 58 which is mounted on mating threads 59 on the outer end 56. Sealing is accomplished by sealing annuli 60 and 61, and by gland seal 51.

Mounted axially within attachment tube 44 is a check valve comprising ball 52, seat 53 and spring 54. This check valve operates in the manner described above to channel oil flow within the adapter and prevent pre-start oil from back-flowing through the filter and back to the engine oil pump. Before the engine starts, the oil pressure from the pre-start pump 9 aids spring 54 in forcing the ball against the seat, thus preventing flow into the filter, and channeling the oil through inlet port 14 into the engine oil galleys (not shown). After the engine has started and the pre-start pump motor 7 has stopped, the pre-start oil pressure drops and the engine oil pressure rises until the difference is sufficient to overcome the force exerted by spring 54 and force the ball 52 off its seat 53. Oil then flows from the engine oil pump through ports 48, the center space 40 within adapter-connector 4, oil filter 6, end 56 of attachment tube 44, and thence through the attachment tube to inlet port 14 on the abutting part 47 of the engine block.

Figure 4:
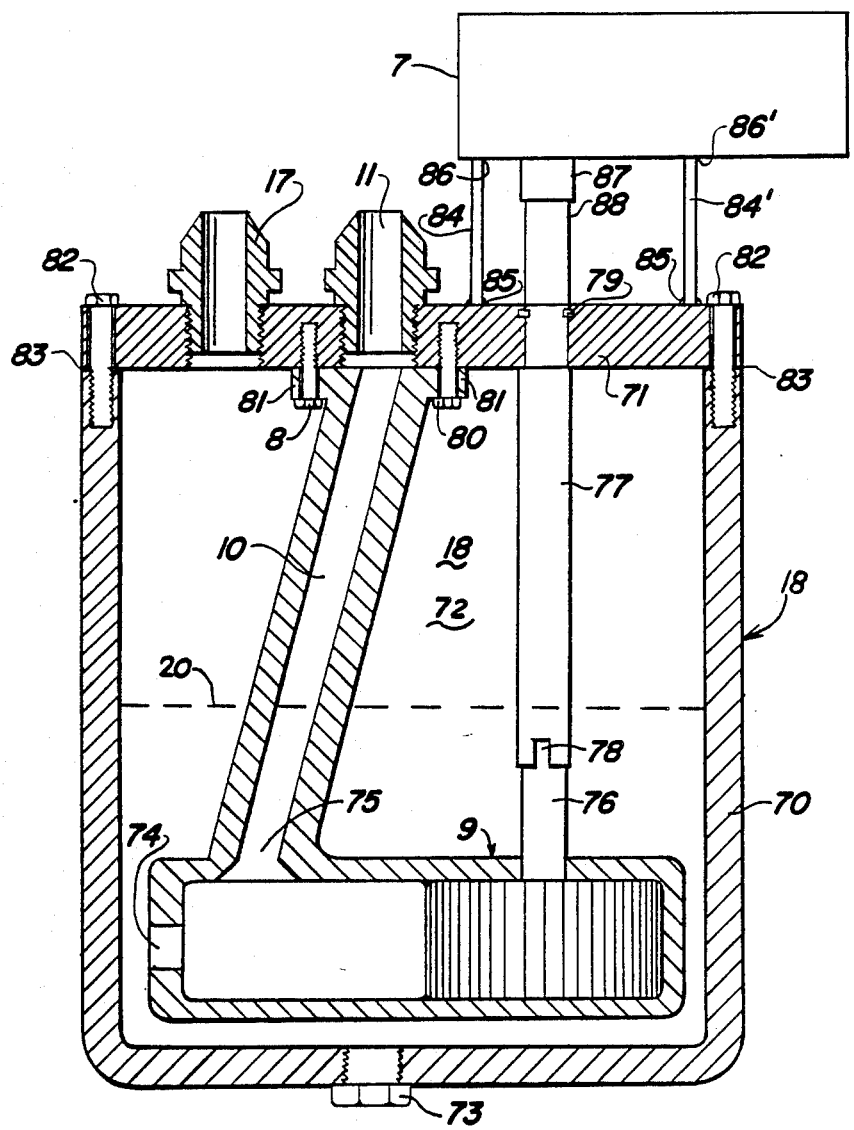
FIG. 4 is a sectional drawing showing the internal details of the pump and reservoir.

Now turning to FIG. 4 which is a view in cross section, reference is made in greater detail to the source of pre-start pressure lubricant. Here it will be seen to comprise oil reservoir 18 having walls 70 and a top 71 affixed thereto thereby to form an enclosed space, or chamber, 72 for storing pre-start lubricant, the normal level of which is shown at 20. Fitted within the bottom part of wall 70 is drain plug 73.

Within the chamber 72 is a pump 9 which may be any one of a number of conventional pumps adapted for pumping engine oil under pressure. One suitable type is that which is conventionally used in internal combustion engines. This pump contains intake and exit ports 74 and 75, the latter being in communication with passageway 10 to convey oil to outlet port 11. It also includes drive shaft 76 which is connected to motor drive shaft 77 by keyed connector 78. Where drive shaft 77 exits from the top 71, it is sealed by packing seal 79.

Pump 9 is secured within reservoir 18 by cap screws which project through flange 81, and top 71 is secured to walls 70 by means of cap screws 82. A gasket 83 provides sealing between the walls 70 and top 71; and threaded surfaces are provided on the exteriors of outlet and inlet ports 11 and 17 for connection of hoses 2 and 3.

Motor 7 is mounted on top 71 by any suitable means such as bracket arms 84 and 84'. These bracket arms may be fastened to the top of 71 by welds 85 or by drilling, tapping and threading. The upper ends 86 and 86' are similarly attached to the case or housing of the motor, or the motor may be fitted with a removable collar to which such ends are attached. The external shaft connection to motor 7 is shown as a conventional collar 87 receiving the upper end 88 of drive shaft 77.

In the interest of simplicity and clarify of description, and since the float valve mechanism 19—19' of FIG. 1 is conventional, it is not again repeated in FIG. 4. However, it should be understood that it or any of a variety of conventional controls may be employed to prevent overfilling of the oil reservoir 18.

It will now be evident that there has been described herein, an improved pre-start oiling apparatus that is readily connectable to existing engine designs without the necessity to make modifications to any part of the engine itself, it being only necessary remove the oil filter and connect an adapter to existing engine fittings. It should also be evident that the adapter is simple in design and easy and relatively inexpensive to manufacture thus contributing to its attractiveness and desirability.

Although the invention hereof has been described by way of example of a preferred embodiment, it will be evident that other adaptations and modifications may be employed without departing from the spirit and scope thereof. For example, the external oil reservoir could be of different geometry.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A pre-start engine lubrication system for engines having inlet and outlet ports to receive and discharge engine lubricating oil, said engine having internal lubrication galleys, said inlet port being in communication with said lubrication galleys, said lubrication system comprising an oil reservoir external to said engine for storing oil said reservoir having an inlet port and an outlet port, pump means in said oil reservoir for delivering pressurized oil to said reservoir outlet, and an adapter-connector adapted for engagement with said engine and including apertures mating with said engine inlet and engine outlet ports, one of said apertures being in communication with said engine inlet port and another of said apertures being in communication with said engine outlet port, means including said adapter-connector for conducting engine oil from said engine outlet port to said reservoir inlet port, and means including said adapter-connector for conducting said pressurized oil from said reservoir outlet port through said adapter-connector and through said engine inlet port to said engine lubrication galleys prior to starting said engine, thereby to provide pre-start lubrication to the interior of said engine.

2. A system according to claim 1 in which said means including said adapter-connector for conducting pressurized oil includes channeling means for channeling said pressurized oil solely through said inlet port and said engine lubrication galleys.

3. A system according to claim 1 in which said system further includes an oil filter and in which said adapter-connector includes means for mounting said filter on said adapter-connector in operational engagement therewith.

4. A system according to claim 2 in which said system further includes an oil filter and in which said adapter-connector includes means for mounting said filter on said adapter-connector in operational engagement therewith.

5. A system according to claim 2 in which said channeling means includes a check valve.

6. A system according to claim 3 in which said channeling means includes a check valve.

7. A system according to claim 4 in which said channeling means includes a check valve.

8. A system according to claim 7 in which said check valve is responsive to the pressure of said pressurized oil to assume a closed state and responsive to engine oil pressure to assume an open state.

9. A system according to claim 4 further including enabling means for preventing engine start until the pressure of said pressurized oil delivered to said engine exceeds a predetermined threshold and for enabling the starting of said engine when said pressure exceeds said threshold.

10. A system according to claim 4 further including means to terminate flow of engine oil through said means for conducting engine oil to said reservoir when the oil reaches a predetermined level in said reservoir.

11. A system according to claim 10 wherein said means for terminating comprises a float valve.

12. A system according to claim 11 wherein said means for delivering pressurized oil to said reservoir outlet port comprises a motorized gear pump within said reservoir.

13. A pre-start engine lubrication system for engines having an outlet port to discharge engine lubricating oil to an oil filter and an inlet port to receive oil from said filter, said engine having internal lubrication galleys, and said inlet port being in communication with said lubrication galleys, said lubrication system comprising an oil reservoir external of said engine for storing a quantity of engine oil, said reservoir having a separate inlet and outlet ports, means including an electrically operated motorized pump within said oil reservoir for delivering oil stored in said reservoir to said reservoir outlet port under pressure, an adapter-connector adapted for engagement with said engine and for conducting engine oil through an oil filter, said adapter including apertures mating with said engine inlet and engine outlet ports, one of said apertures being in communication with said engine inlet port and the other of said apertures being in communication with said engine outlet port, said adapter further including an exit port and an entry port and a normally closed check valve channeling means for channeling oil from said entry port to said engine inlet port, said check valve means assuming an open state in response to oil pressure from said oil filter being greater than oil pressure at said entry port, and means including said adapter-connector for conducting oil under pressure from said reservoir outlet to said entry port through said adapter-connector and through said inlet port to said engine lubrication galleys prior to starting of said engine, thereby to provide pre-start lubrication to the interior of said engine.

14. A system according to claim 13 further including means interconnecting said exit port of said adapter with the inlet port of said oil reservoir and effective upon starting of said engine to replenish the oil in said reservoir.

15. A system according to claim 14 further including means to terminate said replenishing of oil when the oil reaches a predetermined level in said reservoir.

16. A system according to claim 15 wherein said means to terminate comprises a float valve.

* * * * *

UNITED STATES PATENT AND TRADEMARK OFFICE
CERTIFICATE OF CORRECTION

PATENT NO. : 4,703,727

DATED : November 3, 1987

INVENTOR(S) : Jesse D. Cannon

It is certified that error appears in the above-identified patent and that said Letters Patent is hereby corrected as shown below:

Col. 1, line 32, change "purposes" to -- proposes --;

Col. 3, line 19, change "lubrication" to -- lubricating --

Signed and Sealed this

Twenty-second Day of March, 1988

Attest:

DONALD J. QUIGG

Attesting Officer

Commissioner of Patents and Trademarks